Patented Dec. 9, 1952

2,621,193

UNITED STATES PATENT OFFICE 2,621,193

POLYMERIC TITANIUM COMPOUNDS

Carl Martin Langkammerer, Wilmington, Del., assignor to E. I. du Pont de Nemours and Company, Wilmington, Del., a corporation of Delaware No Drawing. Application June 27, 1950, Serial No. 170,703

20 Claims. (Cl. 260—414)

This invention relates to polymeric titanic acid esters and ester-carboxylates, and to novel methods for effecting their preparation. More particularly, it relates to a method for preparing organo-soluble polymeric titanium compounds of the type mentioned through the reaction of organic esters of ortho-titanic acid with a substantially anhydrous aliphatic carboxylic acid.

This application is a continuation-in-part of my copending application Ser. No. 751,139, filed May 28, 1947.

It is known that tetraalkyl ortho-titanates hydrolyze in the presence of water to form titania gel. It has been found that tetraalkyl titanates, on treatment with, for instance, acetic acid, form soluble polytitanates and, as by-products, esters and alcohols corresponding to the alkyl groups originally present in the alkyl titanates.

An object of this invention is to provide new polymeric titanium esters and novel methods of preparing such esters of polytitanic acid. Another object is to provide a readily-controllable method for the preparation of new, high-molecular-weight polymeric esters and ester-carboxylates of polytitanic acid which possesses unique solubility characteristics in organo, especially hydrocarbon, solvents, to provide solutions exhibiting novel surface-active effects and adaptable for use in a wide variety of commercial applications. Further objects and advantages of the invention will appear hereinafter.

In accordance with this invention, an ortho-titanate of the formula $Ti(OR)_4$, where R is alkyl, cycloalkyl, aryl, or aralkyl, is reacted in the presence or absence of an organic solvent with at least one-half molar equivalent of a substantially anhydrous, aliphatic monocarboxylic acid, the reaction being allowed to continue until the desired soluble polymeric polytitanic acid ester or ester-carboxylate is formed.

In a more specific and preferred embodiment, the invention comprises heating an alkyl ortho-titanate, such as tetraethyl titanate, and from ½ to 4 mols of a straight-chain, saturated aliphatic monocarboxylic acid per mol of ortho-titanate, until a stable, soluble polymeric polytitanic ester is formed.

In one practical adaptation of the invention, employing, for example, tetraethyl titanate, the ortho-titanate is mixed with an anhydrous aliphatic carboxylic acid, for example, glacial acetic acid, and in the proportions of from ½ to 2 mols of acid per mol of ortho-titanate. The reactants are then heated for a period of about one hour at temperatures ranging from 50° C.–100° C. under a reflux condenser, the resulting by-product ethanol and ethyl acetate formed being then distilled off as a binary boiling at 71–72° C. If ½ mol of glacial acetic acid per mol of tetraethyl titanate is used, the chief product is a dimer, hexaethyl dititanate. With 1 mol of acid per mol of titanate, an organic-solvent soluble polymeric titanium ester is formed. If 2 or more mols of glacial acetic acid per mol of titanate ester are used, a high-molecular-weight polymeric titanium ester containing carboxylate groups is formed and some degree of branching and ring closure may result. The hydrocarbon-soluble polymeric titanium esters which remain in the distillation apparatus can be removed and used as such, or they can be freed from impurities and by-products by resorting to conventional fractional extraction, vacuum distillation, or other desired recovery or purification methods.

The polymeric titanic acid ester products of this invention are colorless to light-brown liquids and solids. They are unique in that they are readily soluble in organic solvents, such as chloroform, benzene, toluene, xylene, etc., the resulting solutions exhibiting novel and desired surface-active properties.

This invention is further illustrated by the following examples, in which parts are by weight:

Example I

Four hundred and forty-eight parts of tetraethyl titanate and 240 parts of glacial acetic acid were heated under a distillation column and allowed to reflux for one hour. The reaction mixture was then subjected to distillation at atmospheric pressure and a total of 334 parts of a binary of ethyl acetate and ethanol, boiling at 71–72° C. was collected. The pale yellow residue remaining in the distillation vessel was soluble in benzene.

Example II

Two hundred twenty-eight parts of tetraethyl titanate and 60 parts of glacial acetic acid were heated under a distillation column and 124 parts of a binary of ethanol and ethyl acetate distilling at 71–72° C. was collected. The residue was then treated under a high vacuum to remove any remaining volatile materials. A solid product weighing 153 parts was obtained. It was soluble in benzene and other organic solvents. Upon analysis, it contained 30.4 percent of titanium. The theoretical value for $[-TiO(OC_2H_5)_2-]_n$ is 31.2 percent titanium.

Example III

Three hundred forty parts of tetrabutyl titanate and 60 parts of glacial acetic acid were heated under a distillation column and a total of 192 parts of a mixture of butanol and butyl acetate was distilled off at a temperature of 115° C.–120° C. Remaining volatile material was removed by treatment with a vacuum. The product was a light-brown viscous liquid.

Example IV

Forty parts of freshly-distilled tetraethyl titanate and 40 parts of glacial acetic acid were mixed thoroughly and allowed to stand for 16 hours. A solid material separated from the reaction mixture. This material was removed by filtration, washed with glacial acetic acid, and subjected to vacuum evaporation to remove acetic acid and volatile by-products. The resultant titanium ester-carboxylate was soluble in ethanol.

Example V

Four hundred twenty-six and seven-tenths grams of stearic acid were dissolved in 900 cc. of toluene and 142.1 grams of tetraisopropyl titanate were added. One hundred fifty-five cc. of an azeotrope of toluene and isopropyl alcohol (B. P. 79.6–81° C.) were separated by fractional distillation, and the remainder of the toluene was removed in vacuo. A large portion (338.2 grams) of the product was melted and extracted with acetonitrile in a liquid-liquid extractor at about 72° C. In the first 19 hours, 149.6 grams of material which was Ti-free and which solidified on cooling was extracted. In the next 52 hours, 9.4 grams of Ti-free solid were removed, and in the final 72 hours, 2.0 grams of Ti-free solid were removed. The orange-brown, low-melting, wax-like product corresponded to a sesquistearate in analysis:

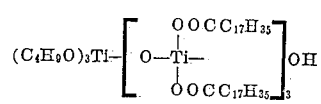

|  |  | Calcd. | Found |
|---|---|---|---|
| Ti | Percent | 9.07 | 9.25, 9.40 |
| C | do | 65.90 | 66.23, 66.15 |
| H | do | 10.90 | 10.80, 10.77 |
| N | do | 0.0 | 0.11, 0.06 |
| Mol. Wt. |  | 3,171 | 2,730, 2,880 |

Example VI

A solution of 68.1 grams (0.2 mol) of tetrabutyl titanate and 227.6 grams (0.8 mol) of stearic acid in 650 cc. of toluene was refluxed, and toluene/butyl alcohol azeotrope containing small droplets of water with withdrawn at the top of a fractionating column. Removal of the remainder of the toluene left 261.7 grams of soft, light-brown solid which was pulverized and twice extracted with acetone, first with 1000 cc. and then with 800 cc. The first extraction removed 133 grams of Ti-free solid, and the second 19.1 grams of Ti-free solid. The resulting distearate melted at 51.6–52.4° C. and corresponded in analysis to:

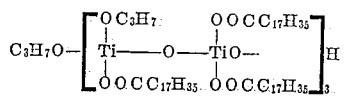

|  |  | Calcd. | Found |
|---|---|---|---|
| Titanium | Percent | 8.81 | 9.10, 9.04 |
| Carbon | do | 66.21 | 66.19, 66.10 |
| Hydrogen | do | 11.02 | 10.76, 10.74 |
| Mol. Wt. |  | 2,177 | 2,360, 2,290 |

Example VII

A solution of 85.1 g. (0.25 mol) of tetrabutyl titanate and 142.3 g. (0.5 mol) of stearic acid in 700 cc. of toluene was refluxed, and butyl alcohol-toluene azeotrope (150 cc., B. P. about 105° C.) was separated by fractional distillation. Removal of the remainder of the toluene in vacuo left a tan solid which weighed 231.6 g. and which had a TiO₂ content of 10.56%. Although the TiO₂ content corresponded closely to the calculated value (10.63% TiO₂) for $$(C_4H_9O)_2Ti(OOCC_{17}H_{35})_2$$

the product was actually found to be a mixture as was shown both by continuous extraction with hot acetonitrile and by batch extraction with acetone at room temperature:

(a) Extraction with acetonitrile removed 47.8% by weight of Ti-free oil and left a solid, polymeric monostearate which had a TiO₂ content of 20.34%.

(b) Extraction with acetone removed 48.3% by weight of Ti-free oil and left a monostearate with a TiO₂ content of 21.15%.

The purified product melted at 69.6–72.1° C. and corresponded closely in analysis to the monostearate:

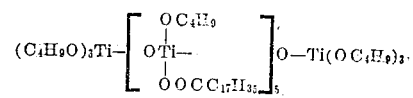

|  |  | Calc. | Found |
|---|---|---|---|
| Ti | Percent | 12.63 | 12.70, 12.68 |
| C | do | 60.68 | 61.26, 60.78, 61.03 |
| H | do | 10.41 | 10.20, 10.44, 10.16 |
| Mol. Wt. |  | 2,653 | 2,720, 2,500 |

Although described as applied to certain specific embodiments, the invention is not to be construed as limited thereto. Hence, variance therefrom can be resorted to without departing from its underlying principles and scope.

The exact structure of the organic polymeric titanium compounds of this invention is not presently known to me, but their composition appears to depend on the ratio of acid to orthotitanic ester used, as indicated in the following equations, wherein R is a hydrocarbon radical selected from the group alkyl, cycloalkyl, aryl and aralkyl, and R' is a monovalent aliphatic hydrocarbon radical containing from 1–20 carbon atoms:

(1)
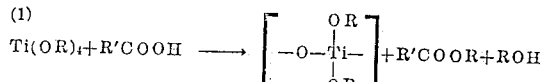

(2)
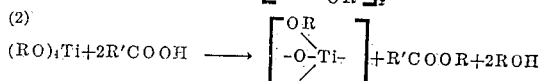

(3)
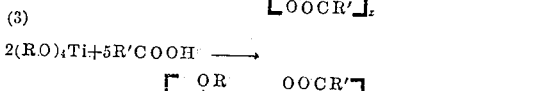

(4)
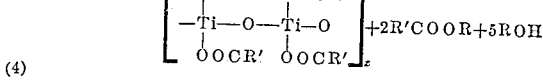

In lieu of the tetra-ortho-titanates mentioned, other organic titanates corresponding to the general formula Ti(OR)₄, and especially those in which R is an alkyl hydrocarbon radical of an alcohol containing from 1–12 carbon atoms, can be used. Specific examples of usefully-employable tetra-ortho-titanates include those of ethyl ortho-titanate, methyl ortho-titanate, isopropyl ortho-titanate, amyl ortho-titanate, octyl ortho-titanate, dodecyl ortho-titanate, as well as 2-ethylhexyl, benzyl, cyclohexyl, phenyl, ethoxyethyl, and beta-naphthyl ortho-titanates, etc.

Although use is preferred of saturated, aliphatic monocarboxylic acids, other aliphatic carboxylic acids, including those containing up to and including 20 carbon atoms, can also be employed. Specific examples of such acids include those of acetic, propionic, butyric, valeric, caproic, heptylic, caprylic, nonylic, capric, lauric, myristic, palmitic, dodecanoic, oleic, ricinoleic, linoleic, stearic, beta-oleostearic, or arachidic, etc.

As already indicated, the molecular ratio of carboxylic acid to tetraortho-titanate determines the nature of the ultimate product and this ratio should be at least 0.5:1.0. For the preparation of the simple polymeric titanium esters, the preferred ratio of acid to ortho-titanate is 1:1. If two or more mols of acid per mol of ortho-titanate are used, the resulting polymeric ester is a titanium ester carboxylate. The expression "polymeric titanium ester," as herein employed, is generic to the simple polymeric esters (resulting from the use of, say, a 1:1 ratio of acid to alkyl ortho-titanate) as well as to the polymeric titanium ester-carboxylate (resulting from the use of acid to alkyl ortho-titanate ratios of 2:1 and higher).

While, in obtaining optimum benefits under my invention, I prefer to employ from ½ to 4 mols of carboxylic acid per mol of tetraalkyl ortho-titanate, use can be made, if desired, of amounts of acid up to, say, 5 or 6 mols or higher per mol of the ortho-titanate. However, since no beneficial effects are realized when resort is had to such higher amounts, and in some instances disadvantageous results may be realized, particularly in respect to yield, the employment of higher amounts of acid than the indicated preferred range is not recommended.

The reaction between the ortho-titanates and contemplated aliphatic carboxylic acids is preferably effected at temperatures ranging from 50° C. to 100° C. If desired, however, the reaction can be carried out at temperatures ranging from 0° C. to 150° C. or 225° C. As noted, the reaction also can be conducted in the presence or absence of organic solvents such as benzene, toluene, xylene, cyclohexane, or the like. The concentration of the solution employed is determined solely by the limits of the solubility of the reactants. For practical purposes, solutions of as high concentration as possible are resorted to.

The polymeric titanic acid esters of this invention, particularly those made from longer chain acids (8 to 20 carbons) which are organo-soluble oils or low melting waxes, are uniquely highly soluble in petroleum and other hydrocarbon solvents. As has been indicated, the resulting hydrocarbon solutions exhibit novel, surface-active properties, illustrations of which are given below:

Solutions were prepared of one gram of polytitanyl ester-carboxylates with $TiO_2$ contents of 15.60% and 21.15%, respectively, in 100 cc. of kerosene. Flowable dispersions resulted when 10 cc. portions of the solutions were stirred with 10 g. of carbon black. In the absence of the ester-carboxylates, mixtures of 10 g. of carbon black and 10 cc. of kerosene were stiff and non-flowable. Dispersions of the above type can be employed as jet engine and other fuels.

Such surface-active properties also render the products of this invention useful as anti-sludging agents for lubricating oils particularly for internal combustion engines. This use is illustrated below:

Pastes (10 g.), prepared by grinding 30 g. of a carbon black with 400 g. of a white mineral oil, were placed in 4-ounce petroleum sample-bottles which were filled to the shoulder with kerosene having dissolved therein 0.2 g. of polytitanyl ester-carboxylates with $TiO_2$ contents of 15.6% and 21.15%, respectively. The titanium compounds materially reduced the rate of settling of the carbon, the ester-carboxylate of lower $TiO_2$ content being the more effective.

The polymeric titanium ester carboxylates are also useful in water-repellent compositions, as illustrated below:

A polymeric isopropoxytitanium stearate (0.3 part) (Ti content, 9.33%) and paraffin wax (5.7 parts) were dissolved in 200 parts of Stoddard solvent. Undyed cotton sateen fabric was padded with this solution and passed through squeeze rolls under pressure so that the weight in the wet state was about twice the dry weight. The treated fabric was air dried and then heated ten minutes at 120° C. It had a soft hand, a light cream color, and good water-repellent properties.

In addition to the uses illustrated, the polymeric titanium ester products of this invention are also useful as pigment (both organic or inorganic white or colored types) dispersing agents, lead scavengers in gasoline, dry cleaning soaps, rust inhibitors for steel, pour point depressants for lubricating oils, crosslinking agents for polymers, components of greases, catalysts for ester interchange reactions, components of cosmetic preparations, etc.

My novel products, particularly those of higher molecular weight, are also useful as plasticizers and modifiers for resinous materials. They are especially useful for increasing the hardness and reducing the drying time of coating compositions, such as paints, enamels, lacquers, and particularly of alkyd resins.

I claim as my invention:

1. A method for producing an organo-soluble polymeric titanium compound which comprises reacting an organic ester of orthotitanic acid having the formula $Ti(OR)_4$, in which R is a hydrocarbon radical selected from the group consisting of alkyl, cycloalkyl, aryl, and aralkyl, with an anhydrous aliphatic carboxylic acid, employing in the reaction at least ½ mol of acid per mol of ester, and continuing said reaction until a soluble polymeric ester is obtained.

2. A method for producnig an organo-soluble polymeric titanium compound which comprises reacting an organic ester of orthotitanic acid having the formula $Ti(OR)_4$, in which R is a hydrocarbon radical selected from the group consisting of alkyl, cycloalkyl, aryl, and aralkyl, with an anhydrous aliphatic carboxylic acid, employing in the reaction at least 2 mols of acid per mol of ester, and continuing said reaction until a soluble polymeric ester is obtained.

3. A method for preparing a stable, soluble polymeric titanic acid ester which comprises reacting a tetrasubstituted alkyl ester of orthotitanic acid with an anhydrous, saturated aliphatic carboxylic acid, employing in the reaction from ½ to 4 mols of carboxylic acid per mol of said alkyl ester, and continuing said reaction until a soluble polymeric ester is formed.

4. A method for preparing a stable, soluble, polymeric titanic acid ester which comprises heating a tetrasubstituted alkyl ester of orthotitanic acid in the presence of an anhydrous, saturated, aliphatic carboxlic acid, the amount of the latter acid being in the ratio of from ½ to 2 mols per mol of the ester, and continuing said heating until a soluble polymeric ester is formed.

5. A method for preparing a hydrocarbon solvent-soluble polymeric titanium ester comprising reacting an orthotitanate of the formula Ti(OR)$_4$, wherein R is a hydrocarbon radical of an alcohol containing from 1–12 carbon atoms, with an anhydrous, saturated, aliphatic monocarboxylic acid containing from 8–20 carbon atoms, and employing in the reaction a ratio of at least 2 mols of carboxylic acid per mol of orthotitanate, continuing said reaction until a soluble polymeric ester is formed, and recovering said polymeric product from the reaction products.

6. A method for preparing a stable, organo-soluble, polymeric titanic acid ester which comprises heating a reaction mixture of a tetrasubstituted alkyl ortho-titanate and an anhydrous, aliphatic, saturated monocarboxylic acid, employing in said mixture at least ½ mol of acid per mol of titanate, continuing said heating until a soluble polymeric ester is formed, and recovering the ester product from the resulting reaction product.

7. A method for preparing a stable, soluble, polymeric titanic acid ester which comprises heating a tetrasubstituted alkyl ortho-titanate in the presence of glacial acetic acid, the molecular ratio of the titanate to the acid ranging from ½ to 2 mols of acid per mol of titanate, and continuing said heating until a soluble polymeric ester is formed.

8. A method for preparing a stable, polymeric titanic acid ester which comprises heating, at temperatures ranging from 50° C. to 100° C., tetraethyl titanate with an amount of glacial acetic acid ranging from ½ to 2 mols per mol of said titanate and continuing said heating until a soluble polymeric ester is formed.

9. As a new organo-soluble polymeric titanium compound, the product obtained by reacting an organic ester of ortho-titanic acid, corresponding to the formula Ti(OR)$_4$ in which R is a hydrocarbon radical selected from the group consisting of alkyl, cycloalkyl, aryl, and aralkyl, with at least a half molar equivalent of an anhydrous aliphatic carboxylic acid per mol of said ester.

10. As a new organo-soluble polymeric titanium ester, the reaction product of a tetrasubstituted alkyl ortho-titanate with a least one molar equivalent of an anhydrous, saturated, aliphatic monocarboxylic acid per mol of said titanate.

11. As a new organo-soluble polymeric titanium ester, the reaction product of a tetrasubstituted alkyl ortho-titanate with from 1 to 4 molar equivalents of an anhydrous, saturated, aliphatic monocarboxylic acid per mol of said ortho-titanate.

12. As a new organo-soluble polymeric titanium ester, the reaction product of a tetrasubstituted alkyl ortho-titanate with at least 2 molar equivalents of an anhydrous, saturated, aliphatic monocarboxylic acid containing from 8–20 carbon atoms.

13. A method for preparing a stable, soluble, polymeric, titanic acid ester which comprises heating tetrabutyl orthotitanate in the presence of glacial acetic acid, the molecular ratio of the titanate to the acid ranging from ½ to 2 mols of acid per mol of titanate, and continuing said heating until a soluble polymeric ester is formed.

14. A method for preparing a stable, soluble, polymeric, titanic acid ester which comprises heating tetraethyl orthotitanate in the presence of an anhydrous, saturated, aliphatic, carboxylic acid, the amount of the latter being in the ratio of from ½ to 2 mols per mol of the ester, and continuing said heating until a soluble polymeric ester is formed.

15. A method for preparing a stable, soluble, polymeric titanic acid ester which comprises heating tetrabutyl orthotitanate in the presence of an anhydrous, saturated, aliphatic, carboxylic acid, the amount of the latter being in the ratio of from ½ to 2 mols per mol of the ester and continuing said heating until a soluble polymeric ester is formed.

16. A method for producing a hydrocarbon-soluble polymeric titanium ester which comprises reacting tetraisopropyl titanate in the presence of an organic solvent with stearic acid, employing in the reaction from 2 to 4 mols of acid per mol of titanate, continuing said reaction until the soluble polymeric ester is formed, and recovering said polymeric product from the products of reaction.

17. A method for producing a hydrocarbon-soluble polymeric titanium ester which comprises reacting tetrabutyl titanate in the presence of an organic solvent with stearic acid, employing in the reaction from 2 to 4 mols of acid per mol of titanate, continuing said reaction until the soluble polymeric ester is formed, and recovering said polymeric product from the products of reaction.

18. As a new organo-soluble polymeric titanium ester, the reaction product of an organic ester of orthotitanic acid having the formula Ti(OR)$_4$, wherein R is a hydrocarbon radical selected from the group consisting of alkyl, cycloalkyl, aryl, and aralkyl, with at least 2 mols of an anhydrous, aliphatic monocarboxylic acid containing from 8–20 carbon atoms.

19. As a new hydrocarbon-soluble polymeric titanium ester, the reaction product of tetraisopropyl titanate with from 2–4 molar equivalents of stearic acid.

20. As a new hydrocarbon-soluble polymeric titanium ester, the reaction product of tetrabutyl titanate with from 2–4 molar equivalents of stearic acid.

CARL MARTIN LANGKAMMERER.

REFERENCES CITED

The following references are of record in the file of this patent:

UNITED STATES PATENTS

| Number | Name | Date |
|---|---|---|
| 2,467,177 | Zimmer | Apr. 12, 1949 |

FOREIGN PATENTS

| Number | Country | Date |
|---|---|---|
| 125,450 | Australia | Sept. 25, 1947 |

OTHER REFERENCES

Scientific Section Educational Bureau American Paint and Varnish Manufacturers Association Circular No. 366, July 1930.

Paint, Oil and Chemical Review, June 8, 1950, page 40.